United States Patent [19]

Eguchi

[11] 4,345,532
[45] Aug. 24, 1982

[54] ELECTRONIC SEWING MACHINE WITH BACK STITCHING SYSTEM

[75] Inventor: Yasukata Eguchi, Kunitachi, Japan

[73] Assignee: Janome Sewing Machine Co. Ltd., Tokyo, Japan

[21] Appl. No.: 133,132

[22] Filed: Mar. 24, 1980

Related U.S. Application Data

[63] Continuation of Ser. No. 486, Jan. 2, 1979, Pat. No. 4,236,468, which is a continuation of Ser. No. 863,143, Dec. 21, 1977, abandoned.

[30] Foreign Application Priority Data

Dec. 27, 1976 [JP] Japan .................................. 51/156462

[51] Int. Cl.³ .............................................. D05B 3/02
[52] U.S. Cl. .................................. 112/158 E; 112/317
[58] Field of Search .................. 112/158 E, 316, 317, 112/121.11

[56] References Cited

U.S. PATENT DOCUMENTS 4,236,468 12/1980 Eguchi ............................ 112/158 E Primary Examiner—Peter P. Nerbun
Attorney, Agent, or Firm—Michael J. Striker

[57] ABSTRACT

Arrangement for forming patterns made up of stitches in an electronic sewing machine includes a static memory comprised of a plurality of storage units, stitch forming means operatively connected to the outputs of the storage units for producing any of different stitches in dependance from the signals produced at the outputs of the memory, addressing means including an addressing counter, synchronizing means, and manually operated back stitching means including an address memory operative to cause the addressing counter to count down the storage units of the static memory.

1 Claim, 10 Drawing Figures

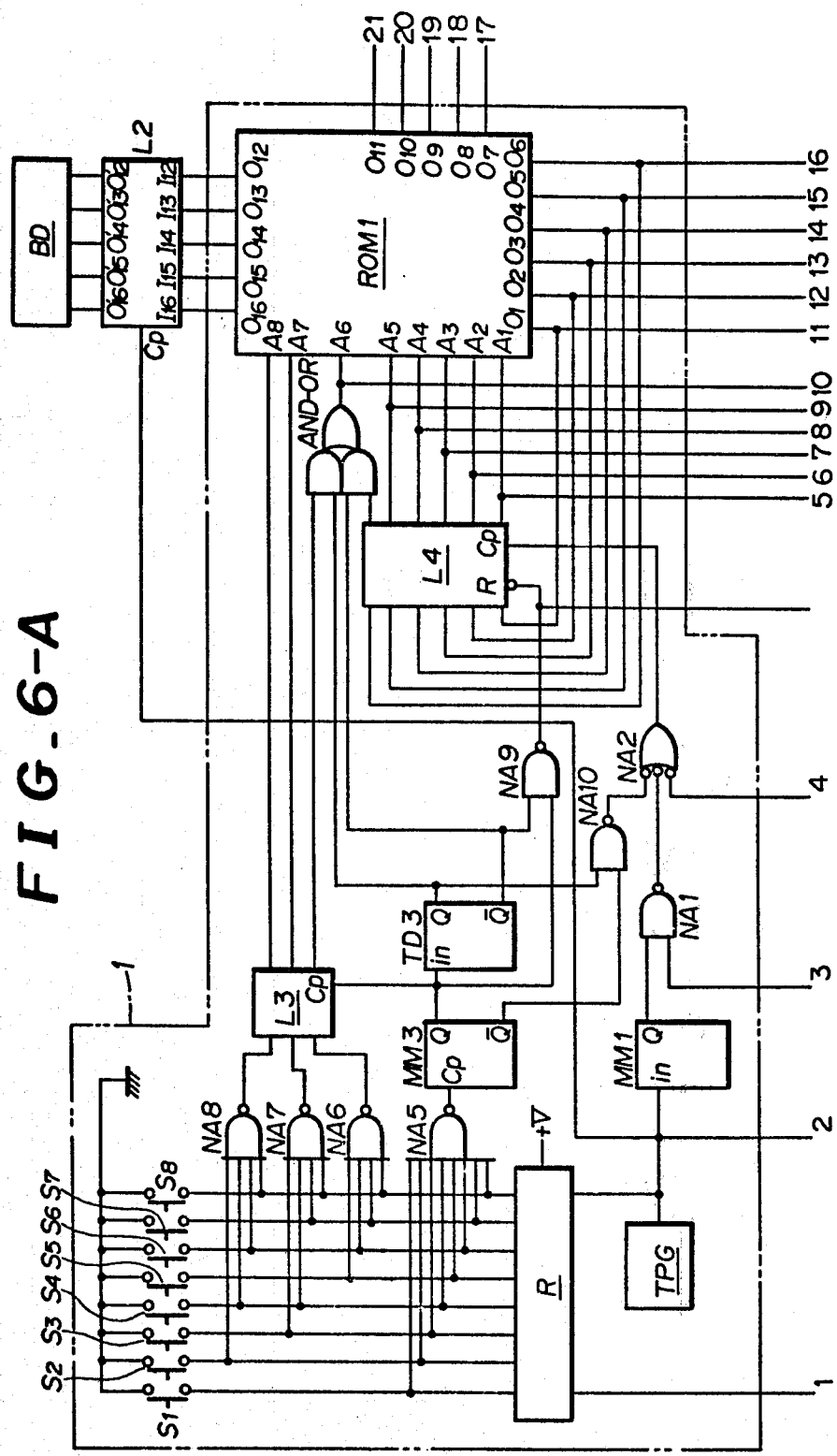
FIG_6-A

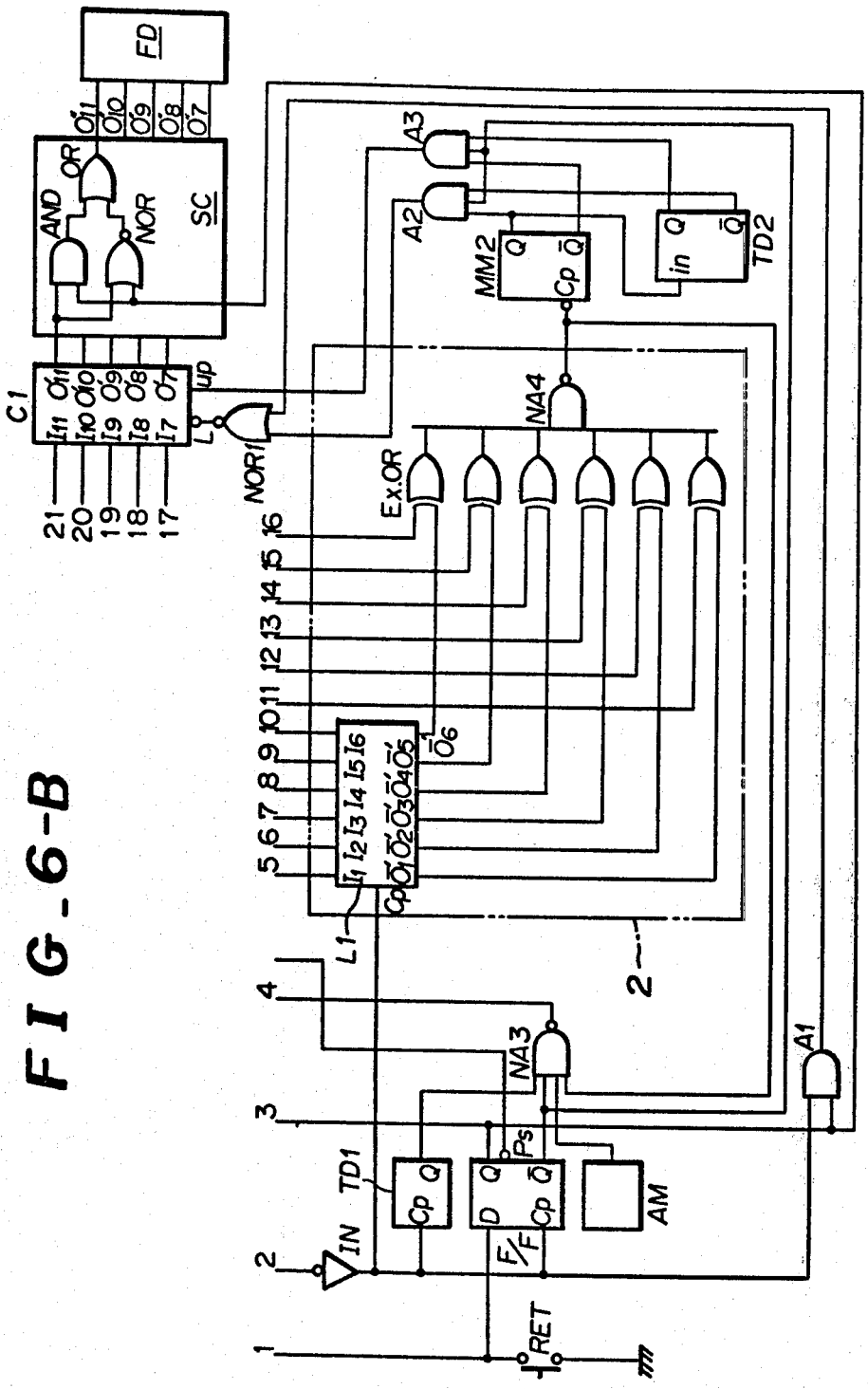
FIG._6-B

ELECTRONIC SEWING MACHINE WITH BACK STITCHING SYSTEM

This is a continuation of application Ser. No. 000,486, filed Jan. 2, 1979, now U.S. Pat. No. 4,236,468 which is a continuation of Ser. No. 863,143, Dec. 21, 1977, now abandoned.

BACKGROUND OF THE INVENTION

The invention relates to a sewing machine, especially relates to an electronic sewing machine with a back stitching system. It is a general practice for a sewing machine operator to make some back stitches after a termination of desired stitches so as to prevent these stitches from being unsewn or unknotted. This is the same with pattern stitches. According to the sewing machine of this invention, it is possible to make back stitches for any kind of patterns either on the way or after the termination of stitching the same tracing the pattern with the same stitches thereof to the initial stitch of the pattern, if it is desired. Namely according to the sewing machine of this invention it is possible to stitch a desired pattern in the rearward stitches as well as in the forward stitches.

According to the conventional zigzag sewing machines, it has been impossible to make back stitches, after a pattern has stitched, exactly tracing the stitches of the pattern for the purpose of preventing aforementioned unsewn or unknotted phenomena. These back stitches have been generally formed with straight stitches or predetermined type of zigzag stitches which are completely different from those of the stitched pattern. Therefore the resultant patterns have been spoiled by these back stitches.

This invention has been provided to eliminate these defects and disadvantages of prior art;

SUMMARY OF THE INVENTION

It is a primary object of this invention to provide a sewing machine capable of making back stitches for any kind of pattern stitches tracing the stitches of the pattern especially for the purpose of preventing the pattern from being unsewn or unknotted.

It is another object of this invention to provide a sewing machine easily accessible to make back stitches either on the way or after the termination of stitching a pattern.

The other features and advantages will be apparent from the following description of the invention in reference to the attached drawings, in which,

BRIEF DESCRIPTION OF THE DRAWINGS

FIGS. 6A and 6B show a preferred embodiment of an electric circuit in accordance to this invention.

DESCRIPTION OF THE PREFERRED EMBODIMENTS

In stitching operations of a sewing machine, it is general to control the movements of the needle and the feed dog while the needle is brought out of the sewn material. In reference to FIG. 4, the letter M indicates a lateral or zigzag movement of the needle. The letter N indicates the feeding movement of the feed dog, and the stitched numerals indicate the needle positions. In stitching a pattern, the stitches are controlled, for example by the signal (M20) for the lateral movement of needle and the signal (N20-21) for the feeding movement of feed dog for the next stitch, which may be delivered in a pair or separately.

Figure 1:
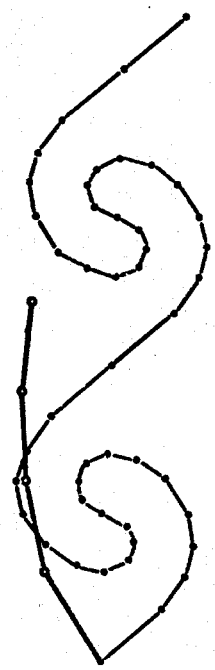
FIG. 1 shows conventional back stitches at the termination of formation of a pattern with a fixed feeding amount and somewhat varied needle positions so as to prevent the stitched pattern from being unsewn.
Figure 2:
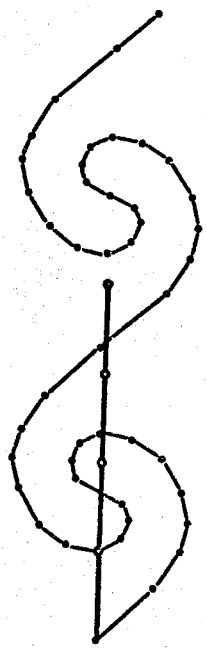
FIG. 2 shows also another conventional back stitches at the termination of formation of a pattern with a fixed feeding amount and a fixed needle position.
Figure 3:
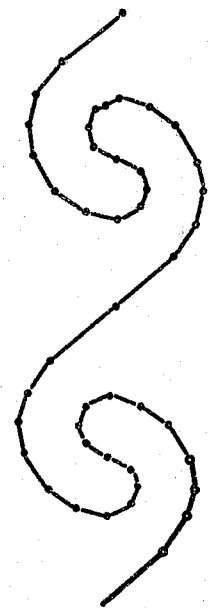
FIG. 3 shows back stitches in accordance to this invention, which are generally made at the termination of a pattern tracing back the stitches of the pattern.
Figure 4:
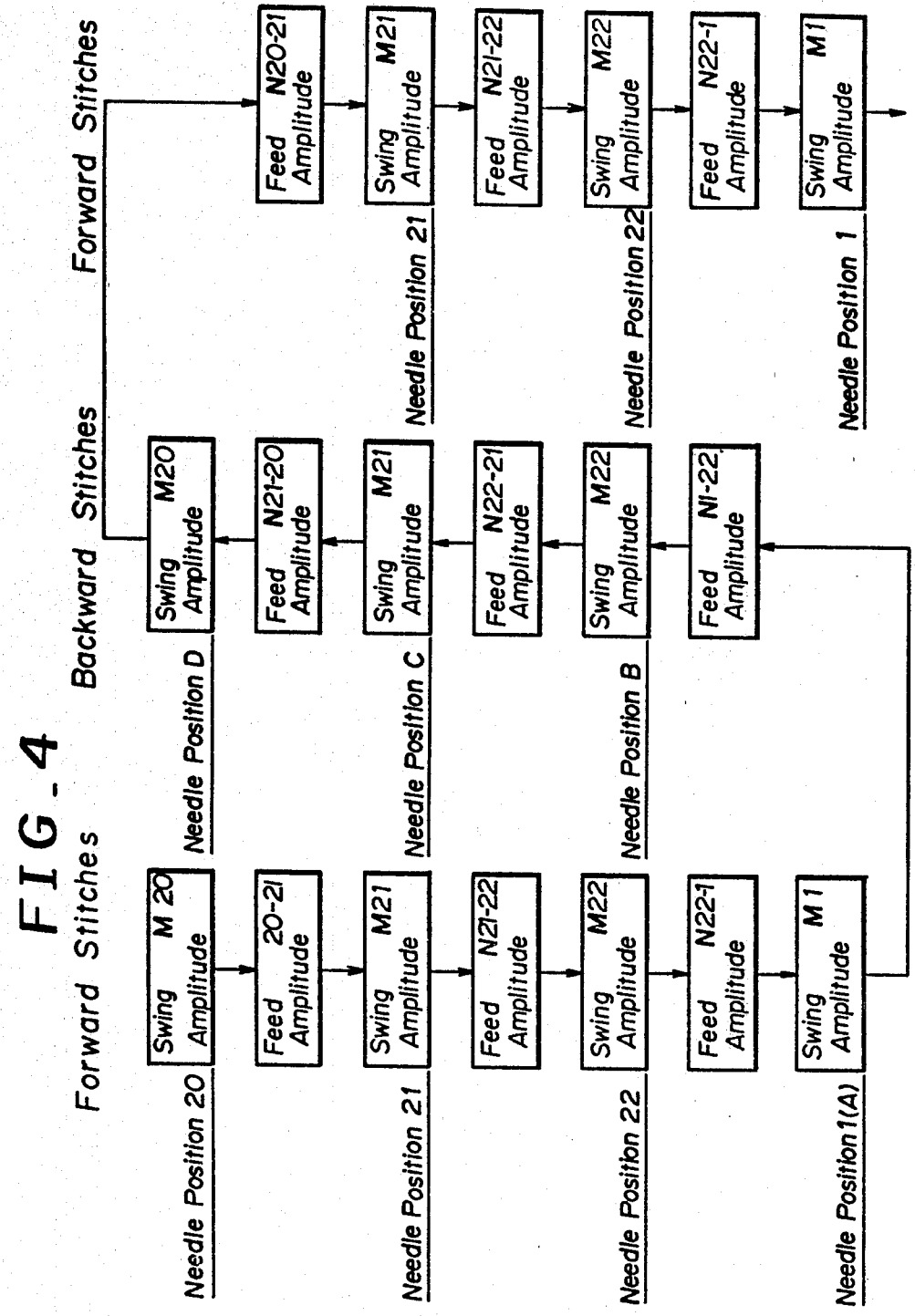
FIG. 4 shows the orders to drive the needle and the feed dog through this invention for stitching a selected pattern, switched to stitching back stitches and switched again to stitching the pattern all tracing the pattern.

If the signals for backward stitches at the termination of formation of the pattern, the lateral movement (M1) of the needle is controlled to form the last stitch of the pattern (which corresponds to the first stitch at the needle position 1 of the back stitches). Simultaneously the next back stitch is formed by a pair of, or separate signals for back feeding movement (N1-22) of the feed dog and lateral movement (M22) of the needle. The next feeding signal (N1-22) is a reversed or turned last feeding signal (N22-1). Thus the following back stitches tracing to the first stitch of the pattern can be formed by the feeding movements and the lateral movements of the needle as shown in FIG. 4, in which the signals for the back stitches are generated in a reversed order in contrast to the signals for forming the initial pattern, with the lateral movements of the needle being unchanged and the feeding movements being reversed. With the termination of the signals for such backward stitches, the signals for the forward stitches are effected again to form the same pattern tracing the initial stitches thereof as shown.

Figure 5:
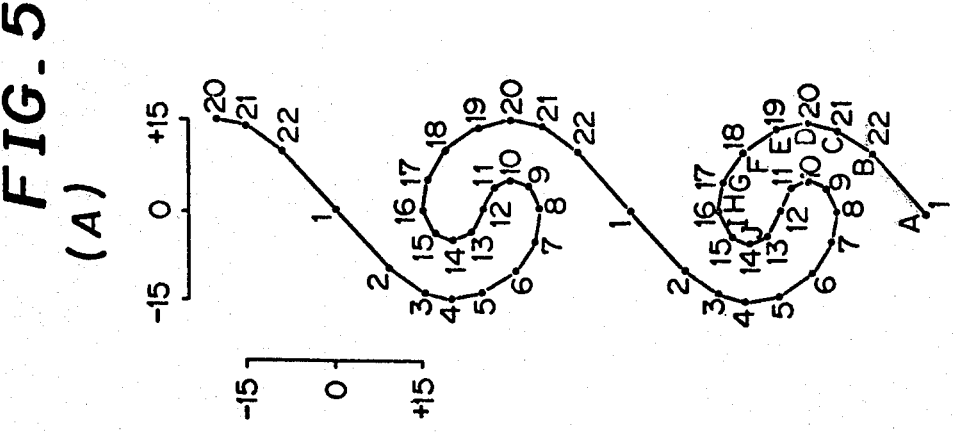
FIGS. 5A–5C show a pattern stitched by the arrangement with accordance to this invention and the stitch coordinates thereof.

FIG. 5-A shows a pattern stitched by a sewing machine of this invention. FIG. 5-B shows the stitch coordinates of the pattern, and FIG. 5-C shows the stitch coordinates tracing back the pattern at the termination thereof. Since the stitches of the pattern can be expressed by the coordinates of the movements of the needle and the feed dog of the sewing machine, the numeral 0 in FIG. 5-A indicates a neutral position of the needle, and the lateral maximum moving points of the needle from the neutral point 0 are indicated by +15 and −15 respectively. In the same manner, the feeding movements are indicated by numeral 0 when the feed dog is ineffective, namely not to feed the sewn material, by +15 when the feed dog feeds the sewn material in a maximum amount in the forward direction from the neutral point 0, and by −15 when the feed dog feeds the sewn material in a maximum amount in the reversed direction from the neutral point 0. The pattern in FIG. 5-A is formed of one cycle of stitches 1–22 with the predetermined needle positions and feeding amounts in the forward and reversed directions. The letters A–J indicate back stitches formed from the stitch 1 to the stitch 14 of the pattern with the same needle positions and the same feeding amounts.

In reference to FIGS. 6-A and 6-B showing an electric circuit which is a prefered embodiment of this invention, a reference numeral (1) denotes a circuit for selectively generates to produce a pattern. (S1)–(S8) denote so many pattern selecting switches. (ROM1) is a static memory storing stitch control signals therein. (A1)–(A8) are so many input terminals of the static memory for receiving address signals. (O1)–(O6) are address changing output terminals of the static memory for addressing the memory itself. (O7)–(O11) are output terminals of the memory for delivering the feed control signals. (O12)–(O16) are output terminals of the memory for delivering control signals for the lateral movements of the needle. (L3) and (L4) are latch circuits. The latch circuit (L3) is connected to the pattern selecting switches (S1)–(S8) through NAND circuits (NA6), (NA7), (NA8) each encoding pattern selecting signals. If any one of the pattern selecting switch is manually operated, NAND circuit (NA5) senses it and generates a signal which operates a monostable multivibrator (MM3). The monostable multivibrator (MM3) generates a signal which is received by the trigger terminal ($C_p$) of the latch circuit (L3) to latch the encoded pattern selecting signal, so that the static memory (ROM1) may address itself in accordance with the pattern selecting signals.

At the time when a pattern is selected, AND-OR circuit (AND-OR) delivers, as an address signal, a pattern selecting signal from the monostable multivibrator (MM3) and time delay circuit (TD3) to the input terminal (A6) of the static memory (ROM1). The subsequent address signals for the subsequent stitches are delivered to the static memory through latch circuit (L4) and the AND-OR circuit. The latch circuit (L4) latches, defines the address for the first stitch, the address signals of ROM1 in dependence upon the pattern selecting signals, and transmits the subsequent address signals to the address terminals (A1)–(A6) of ROM1 each time the trigger terminal ($C_p$) of the latch circuit (L4) receives a timing pulse from the pulse generator (TPG) operated in synchronism with rotation of the upper shaft of the sewing machine. The reset of the latch circuit (L4) is made first by the pattern selecting signal passing through NAND circuit (NA9). Thereafter, the trigger terminal ($C_p$) of the latch circuit (L4) receives a high level signal passing through the NAND circuits (NA10), (NA2), and the latch circuit latches the address signals for back stitches.

(R) is an ordinary limiting resistor receiving a control DC source (+V) and giving a reference voltage to the pattern selecting switches (S1)–(S8), the timing pulse generator (TPG) and a return switch (RET) which will be more precisely described hereinlater. The timing pulse generator (TPG) has an output which is of a high level (H) when the needle is out of the sewn material, and which is of a low level (L) when the needle is in the sewn material, and has an output terminal connected to the monostable multivibrator (MM1) and to the trigger terminal ($C_p$) of latch circuit (L2) for the signals controlling the zigzag movements of the needle. The output terminal of the pulse generator is also connected to the trigger terminal ($C_p$) of latch circuit (L1) via an inverter (IN), to the input terminal (in) of time delay circuit (TD1), to the trigger terminal ($C_p$) of D-type flip-flop circuit (F/F), and to one input terminal of AND circuit (A1).

The return switch (RET) is a manually operated switch which, when operated during a pattern stitching operation of the sewing machine, switches the sewing machine over to making backward or reversed stitches. When the switch is made ineffective, the sewing machine is returned to the normal condition for stitching the pattern. The return switch has one end grounded and the other end connected to the resistor (R) and to the data input terminal (D) of the flip-flop circuit (F/F). The flip-flop circuit (F/F) has a preset terminal ($P_5$) connected to the output terminal of NAND circuit (NA9), so that the flip-flop circuit may be preset at the time of a pattern selection.

The NAND circuit (NA1) has input terminals respectively connected to the output terminal (Q) of the monostable multivibrator (MM1) and to the true side output terminal (Q) of the flip-flop circuit (F/F), and also has an output terminal connected to one of the input terminals of NAND circuit (NA2). NAND circuit (NA3) has input terminals respectively connected to the output terminal (Q) of time delay circuit (TD1), to the complement side output ($\overline{Q}$) of the flip-flop circuit (F/F), to the output terminal of an astable multivibrator (AM), and to the output terminal of NAND circuit (NA4). The NAND circuit (NA3) has an output terminal connected to another input terminal of the NAND circuit (NA2). The NAND circuit (NA2) receives the three signals so as to latch the latch circuit (L4) with the high level output signal thereof. The latch circuit (L4) advances an address for a stitch to the static memory (ROM1) each time when the timing pulse generator generates a pulse. If the return switch (RET) is operated, while a pattern is stitched, the latch circuit (L4) is, prior to the formation of back stitches, operated by a signal from the astable multivibrator (AM) which constantly generates a signal, to give a circulating signal to a comparator (2) which senses an address for the next stitch corresponding to the preceding stitch of the pattern, thereby changing the address changing signals (O1)–(O6) into the desired address signals.

(L1) is a latch circuit having input terminals ($I_1$)–($I_6$), each connected to the address terminals (A1)–(A6) of the static memory (ROM1). The latch circuit (L1) latches the inverted data of the input terminals ($I_1$)–($I_6$) to the output terminals ($\overline{O'}_1$)–($\overline{O'}_6$) when it receives a low level signal of the timing pulse generator (TPG) passing through the inverter (IN). These output terminals ($\overline{O'}_1$)–($\overline{O'}_6$) are each connected to one of the input terminals of each of the exclusive OR circuits (EX, OR) to supply the comparing reference data of the comparator (2) thereto. If the return switch (RET) is operated to produce a low level signal at the same time with the formation of the low level signal of the timing pulse generator (TPG), the resultant signals from the flip-flop circuit (F/F) and the time delay circuit (TD1) makes effective a signal of the astable multivibrator (AM), via the NAND circuit (NA3) to successively circulate the address changing signals (O1)–(O6) of ROM1. If the return switch (RET) is operated after the low level signal of the timing pulse generator (TPG) has been formed, the subsequently generated low level signal of the pulse generator (TPG) is used for such successive circulations of the address changing signals (O1)–(O6) of ROM1. Thus the comparison data of the output terminals (O1)–(O6) are supplied to the exclusive circuits (EX, OR). The output terminals of the exclusive circuits (EX, OR) are connected to the input terminal of NAND circuit (NA4). If the output signals ($\overline{O'}_1$)–($\overline{O'}_6$) of the latch circuit (L1) are each different from the respective circulated address changing signals (O1)–(O6) of ROM1 which are each in pair with the respective signals ($\overline{O'}_1$)–($\overline{O'}_6$) of the latch circuit (L1) (namely, if the output signals $(\overline{O'_1})$-$(\overline{O'_6})$ are identical in each pair with the inputs $(I_1)$-$(I_6)$ latched by the latch circuit (L1), or if the output signals $(\overline{O'_1})$-$(\overline{O'_6})$ are each identical with the address signals for the stitch one step preceding the address $(I_1)$-$(I_6)$), the output of the NAND circuit (NA4) becomes a low level signal for operating the monostable multivibrator (MM2).

(C1) is a counter circuit having input terminals $(I_7)$-$(I_{11})$ connected to the output terminals $(O_7)$-$(O_{11})$ respectively for controlling the movement of the feed dog of the sewing machine. The counter circuit (C1) has output terminals $(O'_7)$-$(O'_{11})$ connected to a switch circuit (SC) (only one unit is shown for convenience sake) which is composed of AND circuit (AND), NOR circuit (NOR) and OR circuit (OR). The AND circuit and the NOR circuit are selectively switched over by the true side output terminal signal (Q) of the flip-flop circuit (F/F) and the output is received by the OR circuit (OR).

With a signal of high level of the timing pulse generator (TPG), namely when the needle is spaced out of the sewn material, the latch circuit (L2) having input terminals $(I_{12})$-$(I_{16})$ latches the needle movement control data at the output terminals $(O_{12})$-$(O_{16})$ of the static memory (ROM1), and transmits these data to the needle drive device (BD). The counter circuit (C1) has a load input terminal (L) to set a value for counting, and is loaded through NOR circuit (NOR1) by AND circuit (A1) which becomes of high level at one of the inputs when the signal of the pulse generator (TPG) is of low level, namely when the needle is in the sewn material during a pattern stitching. The counter circuit (C1) is also preset for backward stitching through AND circuit (A2) which receives a signal at the true side terminal (Q) of the monostable multivibrator (MM2) generated when the needle is in the sewn material, a signal at the complement side terminal $(\overline{Q})$ of delay circuit (TD2) in a condition prior its operation by the input from the monostable multivibrator, and a signal at complement side terminal $(\overline{Q})$ of the flip-flop (F/F). After a certain time has elapsed, the counter circuit (C1) advances one count when the count up terminal (up) receives, the AND circuit (A3), a signal of the true side terminal (Q) of the time delay circuit (TD2) generated by the subsequent operation thereof, a signal of the complement side terminal $(\overline{Q})$ of the monostable multivibrator (MM2) generated after the operation thereof, and a signal of the complement side terminal $(\overline{Q})$ of the flip-flop (F/F). Regarding the switch circuit (SC), when the signal of the true side terminal (Q) of the flip-flop (F/F) is of high level, namely when a pattern is stitched, the AND circuit (AND) is made effective and gives the feed control signals $(O_7)$-$(O_{11})$ of the static memory (ROM1) to the output terminals $(O''_7)$-$(O''_1)$ for the drive device (FD). On the other hand, when the signal of the flip-flop (F/F) is of low level, namely, when back stitches are formed, the NOR circuit (NOR) is made effective to count up by one the feed control signals $(O_7)$-$(O_{11})$, and gives these signals in an inverted form to the output terminals $(O''_7)$-$(O''_{11})$.

The reason to count up and invert these signals is as follows: In this invention, since the data in the static memory (ROM1) are of 5 bits, those data can be expressed by the codes of decimal numbers 0-31. These data stored in the static memory (ROM1) in a predetermined sequence must be inverted for stitching backward stitches while a pattern is stitched. Namely, the relation between the feeding position coordinates and the codes is that, for example, the feeding position coordinate −15 is a code 0, the feeding position coordinate 0 is a code 15, and the feeding position coordinate +15 is a code 30. If these codes are inverted, a code 0 becomes code 30, a code 15 becomes code 15, and a code 30 becomes code 0. For this purpose, if the binary code 00000 is counted up once, the code becomes 00001, which is inverted to be 11110 corresponding to code 30.

With such a combination of the constituent parts, if any one of the pattern selecting switches (S1)-(S8) is operated without the return switch (RET) being operated, the static memory (ROM1) is addressed for a first stitch by the pattern selecting signals encoded by the NAND circuits (NA6), (NA7), (NA8). While the needle is spaced out of the sewn material, the needle control signals $(O_{12})$-$(O_{16})$ of the static memory (ROM1) are latched by the latch circuit (L2) to tetermine the first needle position coordinate. Simultaneously, the feed control signals $(O_7)$-$(O_{11})$ of the static memory (ROM1) are loaded into the counter circuit (C1) when the load input terminal (L) receives a signal of low level from the AND circuit (A1), and the signals are transmitted to the feed control device (FD) through the switch circuit (SC). Thus the output data of the static memory (ROM1) are advanced in synchronism with rotation of the upper shaft of the sewing machine to control the movements of the needle and the feed dog for forming a selected pattern.

If the return switch (RET) is pushed and kept as it is pushed while the upper shaft of the sewing machine is rotated, or after the upper shaft is rotated, or after the upper shaft is stopped, the flip-flop (F/F) is inverted by a signal of low level of the timing pulse generator (TPG) after the sewing machine has stitched the last stitch of the pattern with the last control signal before the return switch (RET) was pushed. The last stitch is based on the needle control signals $(O_{12})$-$(O_{16})$ and the feed control signals $(O_7)$-$(O_{11})$ of ROM1 supplied to the needle drive device (BD) and to the feed dog drive device (FD) respectively by the signal of high level preceding that signal of low level generated by the pulse generator (TPG). Regarding the feed control data $(O_7)$-$(O_{11})$ of ROM1, when the pulse generator (TPG) generates a subsequent signal of low level, namely when the flip-flop (F/F) is inverted, the latch circuit (L1) latches the address signals for the aforementioned last stitch. With the subsequent output of the time delay circuit (TD1), the signal of the astable multivibrator (AM), via NAND circuits (NA3), (NA2), progressively advances the address changing signals of the static memory (ROM1). When the address changing signals coincide with the address signals for said last stitch, namely the address changing signals are delivered together with the stitch control signals for the preceding stitch, the monostable multivibrator (MM2) is operated by the output passing through the exclusive OR circuits (EX, OR) and the NAND circuit (NA4). Thereafter, the output of the NAND circuit (NA4) renders the NAND circuit (NA3) to be of high level, thereby stopping the latching operation of the latch (L4), and then the advancement of the address changing signals ceases. Therefore, the outputs from the static memory (ROM1) are stitch control signals for the stitch preceding the last stitch.

The output signal (Q) of the monostable multivibrator (MM2) is given to the load input terminal (L) of the counter circuit (C1) via the AND circuit (A2) and the NOR circuit (NOR1), so as to apply the feed control signals (O17)–(O11) of the stitch control signals of ROM1 for the preceding stitch to the input terminals (O'7)–(O'11) of the counter circuit (C1). Prior to operation of the feed drive device (FD), when the time delay circuit (TD2) is continuously operated, and the monostable multivibrator (MM2) becomes ineffective, the counter circuit (C1) receiving a signal through the AND circuit (A3); counts up by one, and the data (D'17)–(O'11) are inverted in to the switch circuit (SC). Thus a signal for returning to the Stitch preceding the last stitch is delivered to the feed drive device (FD). In this instance, each output of the static memory (ROM1) has a signal for the preceding stitch as aforementioned. As the upper shaft of the sewing machine is further rotated, and the needle is brought out of the sewn material after stitching the last stitch, the signal of high level of the timing pulse generator (TPG) renders the latch circuit (L2) to latch the needle control signals (O12)–(O16) to be delivered to the needle drive device (BD). When the signal of the timing pulse generator (TPG) becomes high, the monostable multivibrator (MM1) is operated. Since the true side output terminal (Q) of the flip-flop circuit (F/F) however has already been of low level, the NAND circuit (NA1) is of high level, and therefore, the latch circuit (L4) will not latch new address changing data. Therefore, the needle drive device (BD) is driven by the stitch control signals for the stitch preceding the last stitch.

As the upper shaft of the sewing machine is further rotated and the needle is brought into the sewn material, the signal of low level of the timing pulse generator (TPG) renders the latch circuit (L1) to latch the address signals for said preceding stitch in an inverted form as the comparison reference data for the comparator (2). Therefore the NAND circuit (NA4) becomes a low level circuit. With the subsequent output from the time delay circuit (TD1), a signal from the astable multivibrator (AM), through the NAND circuit (NA3), advances the address changing data (O1)–(O6) of the static memory (ROM1). Thus the stitch control signals further preceding the previously formed stitch are selected, and delivered to the needle drive device (BD). These stitch control signals, however, are delivered to the feed drive device (FD) after they have been counted up and inverted in the same manner as aforementioned. In this manner back stitches are successively formed by tracing the pattern which has been previously stitched.

If the return switch (RET) is released and made ineffective, the flip-flop (F/F) is inverted by the subsequent signal of low level of the timing pulse generator (TPG), namely after the last back stitch has been formed. The signal of the inverted flip-flop (F/F), through the NAND circuit (NA1), connects the latch circuit (L4) to the timing pulse generator (TPG) and disconnects the latch circuit (L4) from the astable multivibrator (AM). Therefore, in contrast to the latch circuit (L1) which changes the comparison reference data per stitch, the comparator (2) will not advance the address changing signals before one stitch is formed such as in the case of back stitching, and accordingly the NAND circuit (NA4) will not become a low level circuit. The subsequent feed control signals (O7)–(O11) are loaded to control the feed drive device (FD) by the signal passing through the AND circuit (A1), namely each time when the needle penetrates into the sewn material as aforementioned regarding a pattern stitching.

The change-over of stitches after the return switch (RET) has been released is as follows: in the back stitching, the output data of the static memory (ROM1) are changed while the signal of the timing pulse generator (TPG) is of low level. In this low level region of the signal, the feed control data controls the feed drive device (FD), and the needle control data controls the needle drive device (BD) in the subsequent high level region of the signal of the timing pulse generator (TPG). When the return switch is released, the flip-flop (F/F) is inverted with the subsequent signal of low level of the timing pulse generator (TPG), namely after the last back stitch has been made. The signal from NAND circuit (NA1), however, will not change the output data of the static memory (ROM1) without a new high level signal of the pulse generator (TPG). The last output data of the static memory (ROM1) prior to the release of the return switch (RET) are loaded to the counter circuit (C1) by a signal from AND circuit (A1) in the low level region of the timing pulse generator (TPG). At the same time, since the flip-flop (F/F) is switched over to the AND circuit (AND), the switch circuit (SC) delivers the output signals (O7)–(O11) of the static memory (ROM1) to the feed drive device (FD) in the form as they are. Therefore it will be understood that the output signals (O'''7)–(O'''11) of the switch circuit (SC) are the inverted signals of the last signals for controlling the feed coordinate prior to the release of the return switch (RET). The subsequent high level signal of the timing pulse generator (TPG) advances one step the output signals of the static memory (ROM1) for controlling the next positional coordinates of the needle and the feed dog. Thus it can be understood that the subsequent forward will trace the backward stitches which have been formed until the return switch was made ineffective.

Figure 7:
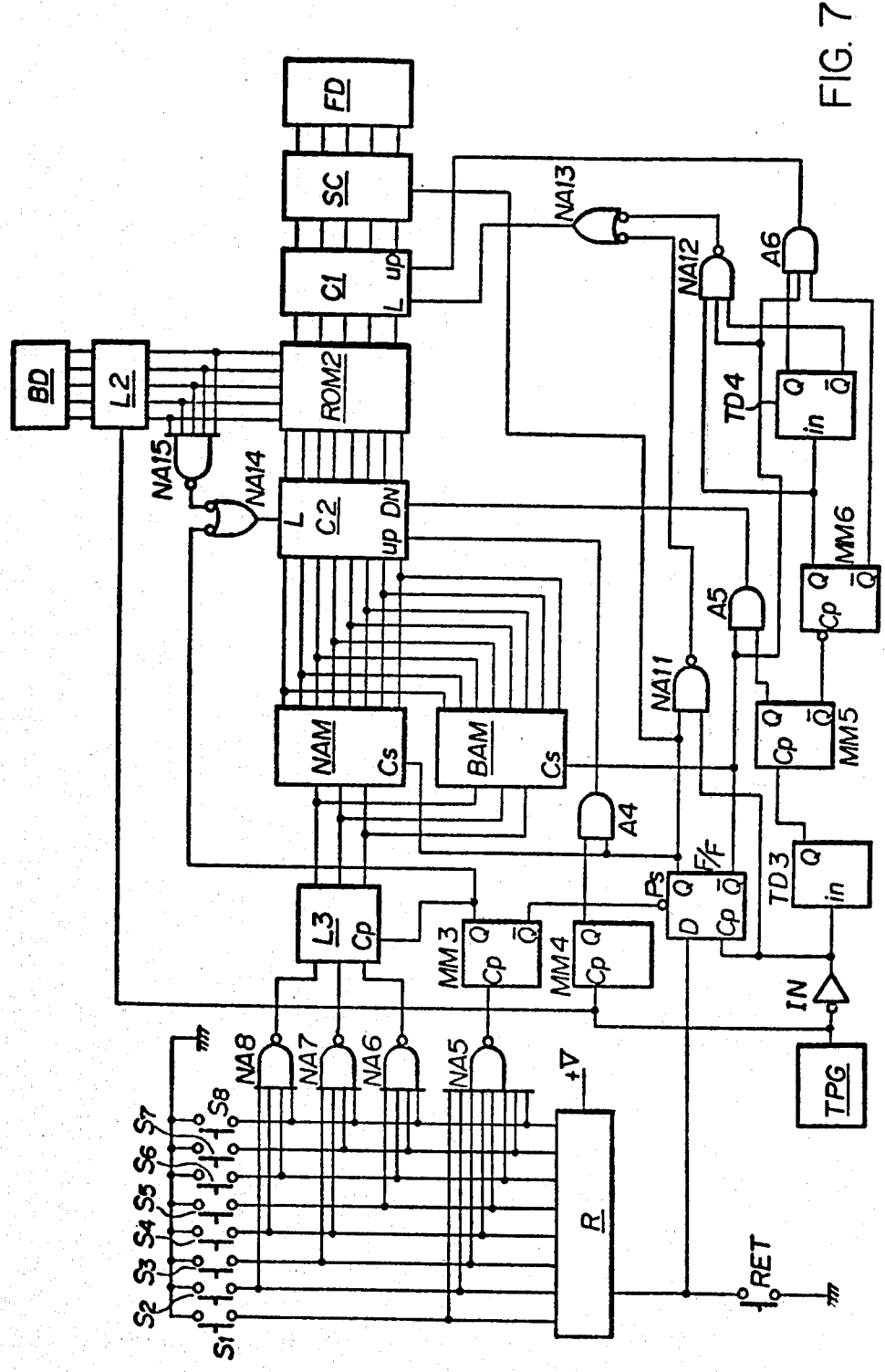
FIG. 7 shows another embodiment of this invention.

FIG. 7 shows another embodiment of the electric control circuit of this invention. In this circuit, the following elements are same with those of FIGS. 6A and 6B: namely, pattern selecting switches (S1)–(S8), latch circuits (L2),(L3), NAND circuits (NA5)–(NA8), monostable multivibrator (MM3), limiting resistor (R), return switch (RET), timing pulse generator (TPG), counter (C1), and switch circuit (SC).

ROM2 is a static memory storing stitch control signals and addressed by an up-down counter (C2). The up-down counter (C2) has input terminals each connected to an address memory (NAM) for determining the initial count point of the forward stitches in a pattern, and to an address memory (BAM) for determining the initial count point of the backward stitches of the pattern. Those memories (NAM), (RAM) receives, via the latch circuit (L3), the encoded signals from the pattern selecting switches (S1)–(S8). The counter (C2) has a load input terminal (L) connected, via the NAND circuit (NA14), to the true side output terminal (Q) of the monostable multi-vibrator (MM3). The counter (C2) receives the outputs of the address memory (NAM) upon receiving a signal from the true side output terminal (Q) of the monostable multivibrator (MM3) which is generated by operation of any one of the pattern selecting switches (S1)–(S8), and starts the initial count of the stitches in dependence upon the outputs of the memory (NAM). After the counter (C2) has counted up a unit of stitch control signals for a selected pattern stored in the static memory (ROM2), the static memory (ROM2) delivers a specific signal (a code 11111) for repeatedly producing the pattern to the NAND circuit (NA15), and the output of the NAND circuit (15) is delivered, via the NAND circuit (NA14), to the load input terminal (L) of the counter (C2). Upon receiving the output signals, the counter (C2) is loaded with the outputs of the address memory (NAM), and repeatedly counts up the stitch control signals in the static memory for the selected pattern.

The address memory (NAM) for the forward stitches has a chip select terminal (CS) connected to the true side output terminal (Q) of the flip-flop circuit (F/F). On the other hand the address memory (BAM) for the backward stitches has a chip select terminal ($C_s$) connected to the complement side output terminal ($\overline{Q}$) of the flip-flop circuit (F/F). As shown, the return switch (RET) is manually operated to selectively effectuate the address memory (NAM) or the address memory (BAM). The counter (C2) has a count-up terminal (up) connected to the output of the AND circuit (A4) which has input terminals respectively connected to the output terminal (Q) of the monostable multivibrator (MM4) which in turn is operated by a high level signal of the timing pulse generator (TPG) and to the true side output terminal (Q) of the flip-flop circuit (F/F). The counter (C2) has a count-down terminal (DN) connected to the output terminal of the AND circuit (A5) which has input terminals respectively connected to the complement side output terminal ($\overline{Q}$) of the flip-flop (F/F), and to the true side output terminal (Q) of the monostable multivibrator (MM5) which is operated by a high level signal of the time delay circuit (TD3) which is, in turn, operated by a low level signal of the timing pulse generator (TPG).

The counter (C1) has a load input terminal (L) connected to the putput of the NAND circuit (NA13) which has one input terminal connected to the output terminal of NAND circuit (NA11) having input terminals respectively connected to the true side output terminal (Q) of the flip-flop (F/F), and to the inverter (IN) which inverts the signal of the timing pulse generator (TPG).

As shown, the monostable multivibrator (NM6) is operated by a low level signal from the complement side output terminal ($\overline{Q}$) of the monostable multivibrator (MM5), and has a true side output terminal (Q) connected to a first input terminal of the NAND circuit (NA12), and to the input terminal (in) of the time delay circuit (T14) which has a complement side output terminal ($\overline{Q}$) connected to a third input terminal of the NAND circuit (NA12), and a true side output terminal (Q) connected to a first input terminal of the AND circuit (A6). The complement side output terminal ($\overline{Q}$) of the flip-flop circuit (F/F) is connected to a second input terminal of the NAND circuit (NA12) and to a second input terminal of the AND circuit (A6). The monostable multivibrator has a complement side output terminal ($\overline{Q}$) connected to a third input terminal of the AND circuit (A6) which has an output terminal connected to the count-up terminal (up) of the counter (C1).

With such a combination of the constituent parts in FIG. 7, if any one of the pattern selecting switches ($S_1$)–($S_8$) is operated without the return switch being operated, the latch circuit (L3) latches the encoded signals, and then the address memory (NAM) for the forward stitches of a pattern, which has been effective, designates the counter (C2) the signals for an initial point from which to start counting. When the load input terminal (L) of the counter (C2) receives a signal from the NAND circuit (NA5), the counter is loaded with the signals of the address memory (NAM) and delivers the address signals for the first stitch to the static memory (ROM2). Subsequently each time the timing pulse generator (TPG) generates a signal of high level, the signal is delivered to the count-up terminal (up) of the counter (C2) via the monostable multivibrator (MM4) and the AND circuit (A4). Thus the counter (C2) counts up to progressively advance the output signals of the static memory (ROM2), of which the needle control signals are latched by the latch circuit (L2) and delivered to the needle drive device (BD) while the needle is spaced out of the sewn material.

Regarding the feed control signals, when the load input terminal (L) of the counter (C1) with the signal passing through the NAND circuit (NA11) and the NAND circuit (13), the counter (C1) is loaded with the feed control signals of the static memory (ROM2), which are delivered to the feed drive device (FD) through the AND circuit (AND) (not shown) of the switch circuit (SC).

If the return switch (RET) is pushed and kept as it is pushed while the sewing machine is operated or after it has once been stopped, the flip-flop circuit (F/F) is inverted by the low level signal of the timing pulse generator (TPG) which had been generated before the return switch (RET) was operated to have operated the needle to form the subsequent stitch with the last pattern control signals of the static memory (ROM2). Namely said last stitch is based on the needle control signals delivered to the needle drive device (BD) by the high level signal preceding said low level signal.

For the feed control signals, which are the subsequent low level signal of the pulse generator (TPG), namely with the inversion of the flip-flop circuit (F/F), the backward stitching address memory (BAM) is made effective. The output of the subsequently operated time delay circuit (TD3) counts down the counter (C2) via the monostable multivibrator (MM5) and the AND circuit (A5), thereby producing the signals of the static memory (ROM2) preceding the signals for the last stitch. Thus the sewing machine is ready for stitching a first back stitch tracing the last stitch of the pattern. Simultaneously the monostable multivibrator (MM8) is operated to produce a signal. The signal of the monostable multivibrator (MM6), together with a signal ($\overline{Q}$) of the complement side output of the time delay circuit (TD4) generated before it is operated, renders the counter (C1), via the NAND circuits (NA12),(NA13), to load said signals for the stitch preceding the last stitch. Subsequently the signal of the time delay circuit (TD4), via the AND circuit (A6), counts up the counter (C1) by one. Since the switch circuit (SC) has the NOR circuit (NOR) having been effective, the feed drive device (FD) operates to feed the sewn matrial in the back-ward direction for one stitch. Thus the subsequent stitches are produced in the backward direction tracing the pattern stitches which have already been formed. If the return switch (RET) is released and made ineffective, the subsequent stitches are produced in the forward direction tracing said backward stitches of the pattern.

Now in accordance to this invention, it can be understood that some back stitches are obtained, after a termination of a pattern stitching, tracing some stitches of the pattern with the same stitches so as to prevent the stitched pattern from being unsewn.

Further it is possible to stitch a pattern in the forward and/or in the backward feeding movement of the feed dog.

I claim:

1. In a sewing machine, an arrangement for forming patterns made up of stitches, comprising, in combination, a static memory having a plurality of outputs and a plurality of address signal inputs and comprised of a plurality of storage units connected to said inputs and outputs and addressable by address signals applied to the address signal inputs of the memory; stitch-forming means provided with a plurality of stitch control signal inputs connected to the outputs of the memory and operative for producing any of a plurality of different stitches in dependence upon the signals produced at the outputs of the memory; addressing means including an addressing counter operative when activated for applying the address signals to the address inputs of the static memory to read out stitch control signals from the memory; synchronizing means operative for activating the addressing means in synchronism with the operation of the stitch forming means; and back stitching means manually operated to change the address signals in accordance with the required back stitches, said back stitching means including a manually operated switch, an address memory operative, when the manually operated switch is operated, to cause the addressing counter to count down the storage units of the static memory by the address signals, and signal inverting means connected between the static memory and the stitch-forming means to invert the stitch control signals read out from the static memory.

* * * * *